(12) United States Patent
Park

(10) Patent No.: US 6,272,357 B1
(45) Date of Patent: Aug. 7, 2001

(54) METHOD FOR MAKING CALL RESERVATION USING PORTABLE UNIT IN FACSIMILE APPARATUS

(75) Inventor: Joo-Seung Park, Kumi-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/099,201

(22) Filed: Jun. 18, 1998

(30) Foreign Application Priority Data

Jun. 18, 1997 (KR) .................................................. 97-25349

(51) Int. Cl.⁷ .............................. H04B 1/38; H04M 1/00
(52) U.S. Cl. ........................ 455/557; 455/462; 455/510; 455/66; 379/100.02; 379/100.16; 379/100.14; 358/468
(58) Field of Search ..................................... 455/403, 426, 455/561, 554–557, 465, 462; 379/100.01, 100.02, 100.06, 100.14, 100.15, 100.16; 358/468, 305

(56) References Cited

U.S. PATENT DOCUMENTS

| | | | |
|---|---|---|---|
| 5,027,385 | * 6/1991 | Nakagawa et al. | 379/100.15 |
| 5,048,073 | 9/1991 | Weiser et al. | 455/557 |
| 5,159,624 | 10/1992 | Makita | 455/31.2 |
| 5,200,991 | 4/1993 | Motoyanagi | 455/465 |
| 5,255,312 | 10/1993 | Koshiishi | 379/100.15 |
| 5,282,238 | 1/1994 | Berland | 455/557 |
| 5,426,511 | 6/1995 | Nagatomo | 358/402 |
| 5,446,782 | 8/1995 | Kurokawa et al. | 455/557 |
| 5,479,485 | * 12/1995 | Hayashi | 455/462 |
| 5,517,556 | * 5/1996 | Pounds et al. | 379/88.25 |
| 5,519,763 | 5/1996 | Namekawa et al. | 455/556 |
| 5,590,406 | 12/1996 | Bayley et al. | 370/493 |
| 5,608,545 | 3/1997 | Kagawa | 358/468 |
| 5,699,171 | 12/1997 | Minamizawa et al. | 358/440 |
| 5,752,199 | 5/1998 | Scott | 455/557 |
| 5,761,283 | * 6/1998 | Chung | 379/100.06 |
| 6,035,022 | * 3/2000 | Kim | 379/100.01 |

FOREIGN PATENT DOCUMENTS

363054051A * 3/1988 (JP) .
402112367A * 4/1990 (JP) .
404002255A * 1/1992 (JP) .

* cited by examiner

Primary Examiner—Dwayne Bost
Assistant Examiner—Charles Craver
(74) Attorney, Agent, or Firm—Robert E. Bushnell, Esq.

(57) ABSTRACT

A facsimile apparatus has a plurality of portable units, and enables a subscriber to make a call reservation and conduct a telephone conversation on the reserved call, using the portable units. A base unit of the facsimile apparatus sets up a call reservation in response to a call reservation request signal from the portable unit, while the facsimile apparatus transmits and receives image data. Upon completion of transmitting and receiving the image data, the base unit connects a voice communication path between the portable unit and a facsimile of the other party, so that the subscriber can make the call reservation and talk with the other party over the telephone by using the portable unit.

16 Claims, 5 Drawing Sheets

METHOD FOR MAKING CALL RESERVATION USING PORTABLE UNIT IN FACSIMILE APPARATUS

CLAIM OF PRIORITY

This application makes reference to, incorporates the same herein, and claims all benefits accruing under 35 U.S.C §119 from an application entitled Method For Making Call Reservation Using Portable Unit In Facsimile Apparatus earlier filed in the Korean Industrial Property Office on Jun. 18, 1997, and there duly assigned Serial No. 97-25349 by that Office.

BACKGROUND OF THE INVENTION

1. Field of the Invention

The present invention relates to a facsimile apparatus having a plurality of portable units, and in particular, to a method for making a call reservation and carrying on a telephone conversation, using a portable unit.

2. Description of the Related Art

It is known in the art to enable a facsimile device to communicate with a portable unit for various purposes, and there are a number of different communication techniques for enabling the facsimile device to communicate with a portable unit, as exemplified by: U.S. Pat. No. 5,048,073 to Isaac Weiser et al. entitled Telephone Line Switching Interface Unit; U.S. Pat. No. 5,159,624 to Hiroshi Makita entitled Communication System For Transmitting To A Portable Receiver Data Indicative Of Received Image Or Voice Signals; U.S. Pat. No. 5,200,991 to Teruo Motoyanagi entitled Image Communication System Including A Mobile Telephone Set And A Facsimile Device; U.S. Pat. No. 5,255,312 to Takaho Koshiishi entitled Facsimile Machine Connectable To Various Communication Equipments; U.S. Pat. No. 5,446,782 to Osamu Kurokawa et al. entitled Terminal Connecting Device Having An Auto Data Receiving Function; U.S. Pat. No. 5,479,485 to Motohiko Hayashi entitled Facsimile Apparatus Comprising Cordless Telephone Set; U.S. Pat. No. 5,519,763 to Takeshi Namekawa et al. entitled Communication Apparatus With Wireless Intercommunication; and U.S. Pat. No. 5,608,545 to Tetsuya Kagawa entitled Facsimile Device And Communication Control Method Thereof.

I have contemplated providing portable units of a facsimile apparatus with a call reservation function which enables the user to make a call reservation during transmission and reception of image data so as to automatically establish a voice communication path (or speech path) to a facsimile of the other party upon completion of transmitting and receiving the image data, so that the user can conduct a telephone conversation with the other party after the image data is completely transmitted and received. Such a call reservation function is advantageous in that the user can talk with the other party over the telephone immediately after transmission and reception of the image data, even without dialing the telephone number for the other party.

In a facsimile apparatus with a plurality of portable units, having the call reservation function will allow the user to make the call reservation, and talk with the other party over the telephone, using the portable unit to communicate with the base unit of the facsimile apparatus. Therefore, when the user is away from the base unit of the facsimile apparatus, instead of him or her having to move to the place where the facsimile apparatus is located to make the call in order to talk with the other party over the telephone, the user can make a call reservation from the portable unit. Portable units of a conventional facsimile apparatus do not support such a call reservation function, though they provide the other functions for setting facsimile transmission and reception. Thus, my invention overcomes the problem of the user having to move to the place where the base unit of the facsimile apparatus is located in order to make the call, which results in the user having to remain with the base unit so that he or she can conduct the telephone conversation on the reserved call. Accordingly, my invention enables the user to make the call reservation, and conduct the telephone conversation, using the portable units.

SUMMARY OF THE INVENTION

It is therefore an object of the present invention to provide a method for making a call reservation, and conducting a telephone conversation on the reserved call, using a portable unit.

To achieve the above object, there is provided a method for making a call reservation using a portable unit in a facsimile apparatus. In the method, a base unit of the facsimile apparatus sets up a call reservation in response to a call reservation request signal from the portable unit, while the facsimile apparatus transmits and receives image data. Upon completion of transmitting and receiving the image data, the base unit connects a voice communication path between the portable unit and a facsimile of the other party, so that the subscriber can talk with the other party over the telephone by using the portable unit making the call reservation.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will be described in detail hereinbelow with referent to the accompanying drawings. In the following description, numerous specific details are set forth to provide a more thorough understanding of the present invention. It will be apparent, however, to one skilled in the art that the present invention may be practiced without these specific details. In other instances, well known functions or constructions have not been described so as not to obscure the present invention.

Figure 1:
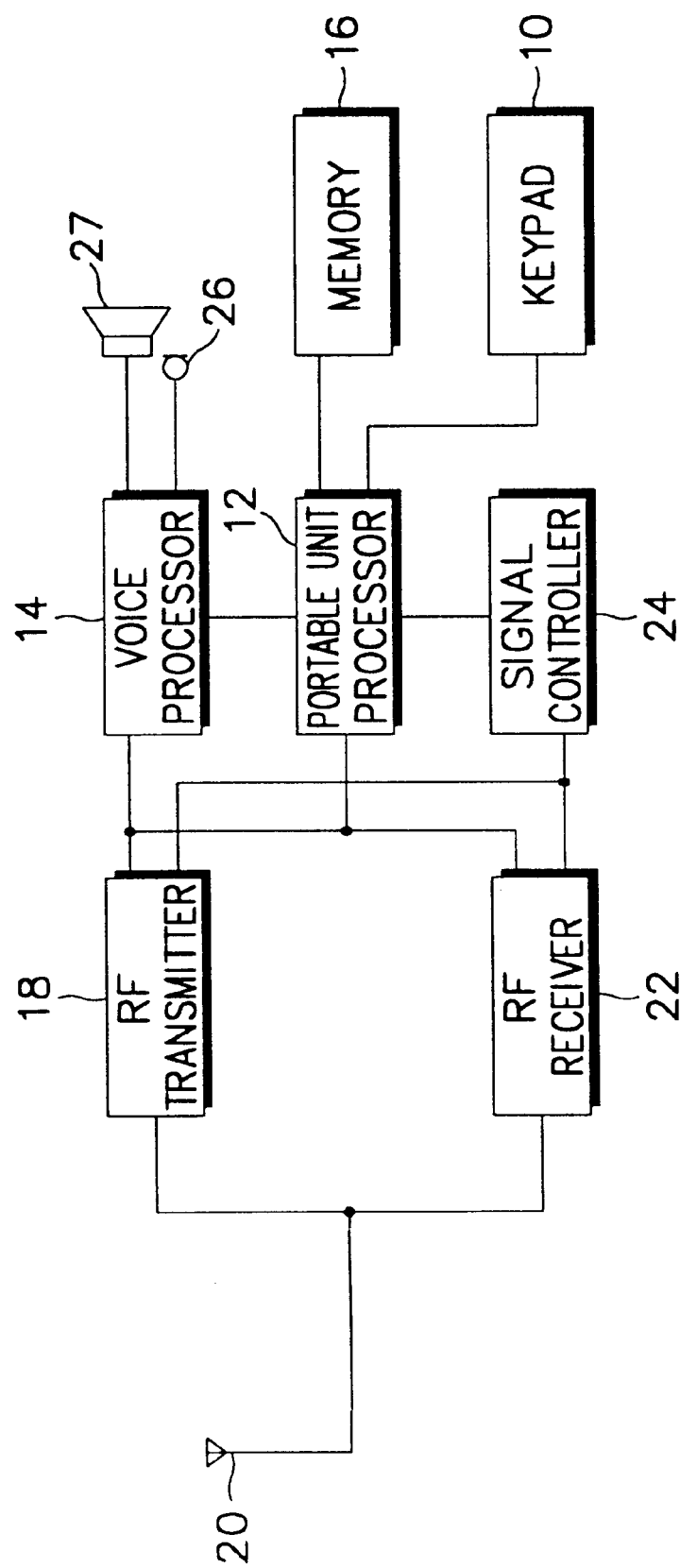
FIG. 1 is a block diagram of a portable unit belonging to a facsimile apparatus according to the principles of the present invention.

Referring to FIG. 1, there is shown a portable unit belonging to the facsimile apparatus applied to the present invention. A portable unit is defined as a unit which performs wireless communication using a radio frequency. A portable unit controller 12 controls an overall operation of the portable unit. A keypad 10 includes a number of function keys and numeric keys, with which the user can dial the telephone numbers. Key data output from the keypad 10 is provided to the portable unit controller 12. A memory 16 stores a control program and a password of the portable unit. An RF (Radio Frequency) transmitter 18 transmits a transmission voice signal output from a voice processor 14 and data output from the portable unit controller 12 via an antenna 20, under the control of the portable unit controller 12. An RF receiver 22 demodulates an RF signal received through the antenna 20 into a voice signal and control data, and outputs the voice signal to the voice processor 14 and the control data to the portable unit controller 12. A signal controller 24 controls the RF transmitter 18 and the RF receiver 22 according to the control data output from the portable unit controller 12. The voice processor 14 processes a voice signal input from a microphone (or mouthpiece) 26 and a voice signal output from the RF receiver 22, and transfers the processed voice signal to the RF transmitter 18. Further, the voice processor 14 processes the voice signal received through the RF receiver 22 and outputs the processed voice signal to a speaker (or earpiece) 27.

Figure 2:
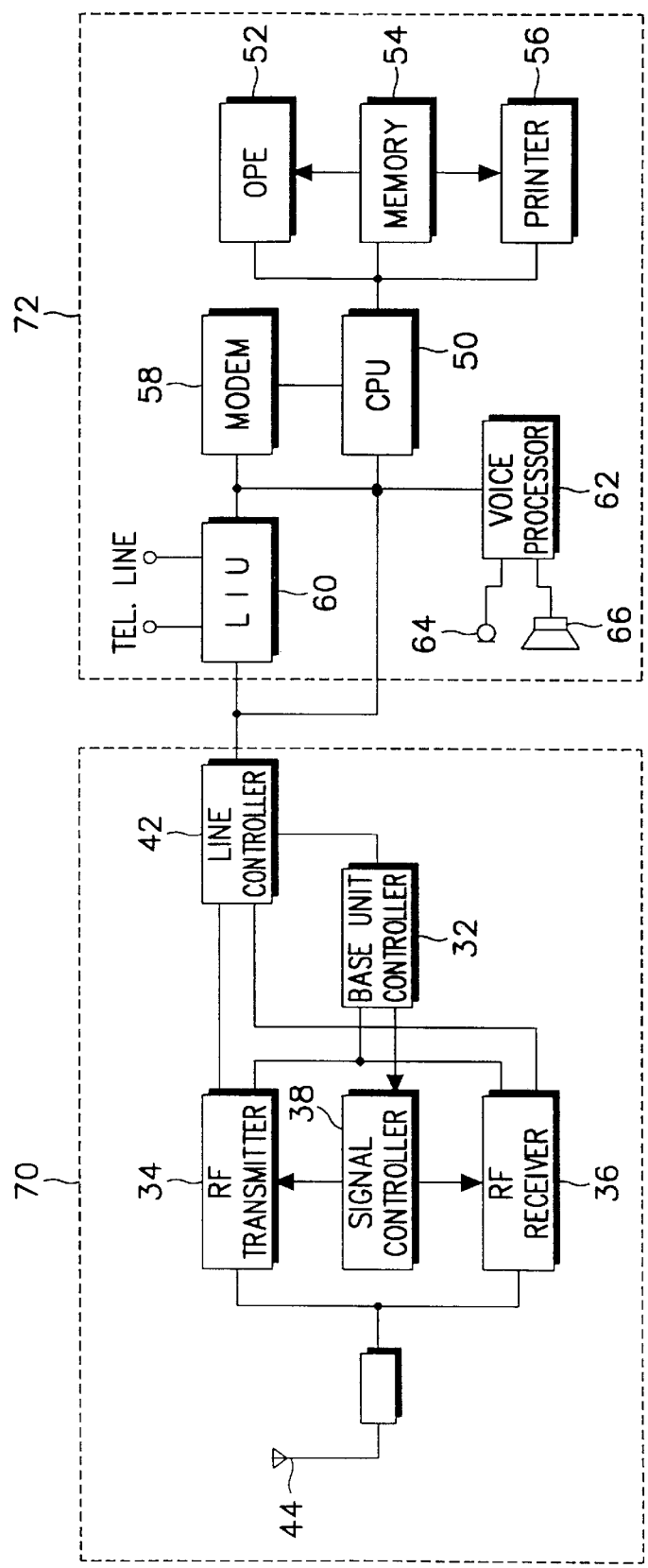
FIG. 2 is a block diagram of a facsimile apparatus according to the principles of the present invention.

Referring to FIG. 2, a base unit of the facsimile apparatus cooperating with the portable unit of FIG. 1, consists of an RF section 70 and a facsimile section 72. As to the construction of the RF section 70, a base unit controller 32 controls an overall operation of the base unit. The base unit controller 32 has an internal memory consisting of a ROM (Read Only Memory) for storing a program and a RAM (Random Access Memory) for temporarily storing data generated in the process of executing the program. In particular, the internal memory may store a password of the portable unit. An RF transmitter 34 modulates a transmission signal and transmits the modulated signal through an antenna 44, under the control of the base unit controller 32. An RF receiver 36 demodulates an RF signal input from the antenna 44 into the voice signal and the control data, and outputs the voice signal to a voice processor 62 of the facsimile section 72 via a line controller 42 and the control data to the base unit controller 32. A signal controller 38 controls the RF transmitter 34 and the RF receiver 36 according to channel data output from the base unit controller 32. The line controller 42 selects a voice communication line and a data communication line to transmit/receive the voice signal and the communication data therethrough, under the control of the base unit controller 32.

As to the construction of the facsimile section 72, a central processing unit (CPU) 50 controls an overall operation of the facsimile section 72 according to a control program stored in a memory 54. In particular, the CPU 50 controls the facsimile section 72 such that the user can make a call reservation and conduct the telephone conversation on the reserved call using the portable unit of FIG. 1, upon receiving a call reservation request signal generated from the portable unit. A line interface unit (LIU) 60 connects data communication path between a telephone line and a modem 58 under the control of the CPU 50, detects an incoming ring signal, and provides the detected ring signal to the CPU 50. The modem 58 demodulates a modulation signal input from the line interface unit 60, and modulates a transmission signal to transmit it to the telephone line via the line interface unit 60. An operating panel equipment (OPE) 52 includes a plurality of keys for setting various functions supported by the facsimile and inputting various commands. The operating panel equipment 52 provides the CPU 50 with the key data input by the user. Furthermore, the operating panel equipment 52 includes a display unit, such as a liquid crystal display (not shown), for displaying thereon an operating status of the facsimile under the control of the CPU 50. A printer 56 prints image data received from the other party, or read from a document in a copy mode, on recording paper, under the control of the CPU 50. The memory 54 is composed of a ROM and RAM, in which the ROM stores the control program of the CPU 50, and the RAM stores the image data received from the other party, or read from the document, and temporarily stores data generated in the process of executing a specific function of the facsimile. A voice processor 62 converts the analog voice signal input from the telephone line via line interface unit 60, or from a microphone (or mouthpiece) 64, into digital voice data to store the digital voice data into the memory 54. Further, the voice processor 62 reads the digital voice data from the memory 54 and converts the read voice data into an analog voice signal to output it to a speaker (or earpiece) 66, or the telephone line.

Figure 3A:
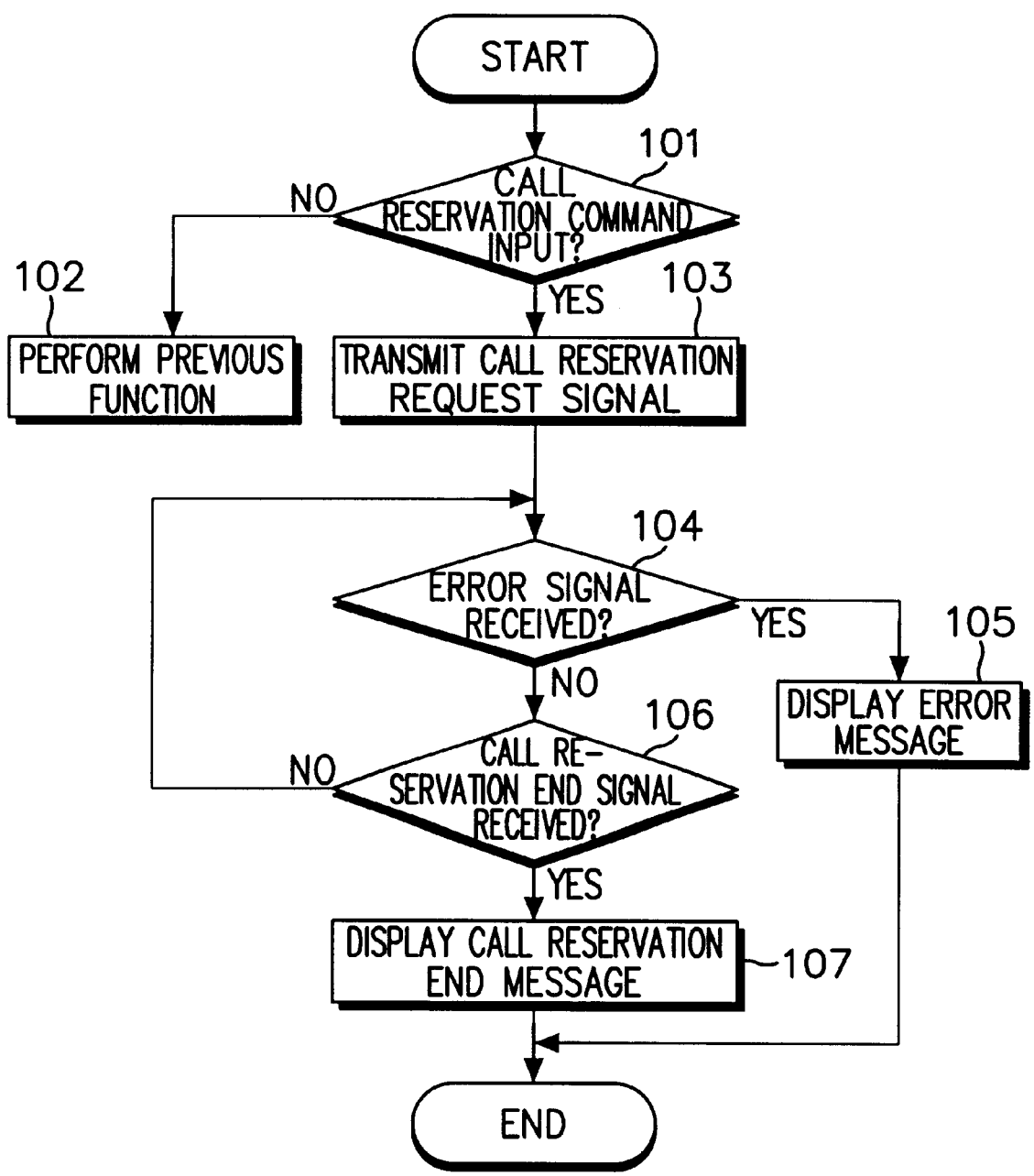
FIGS. 3A and 3B are flow charts for making a call reservation using the portable unit according to the principles of the present invention.
Figure 3B:
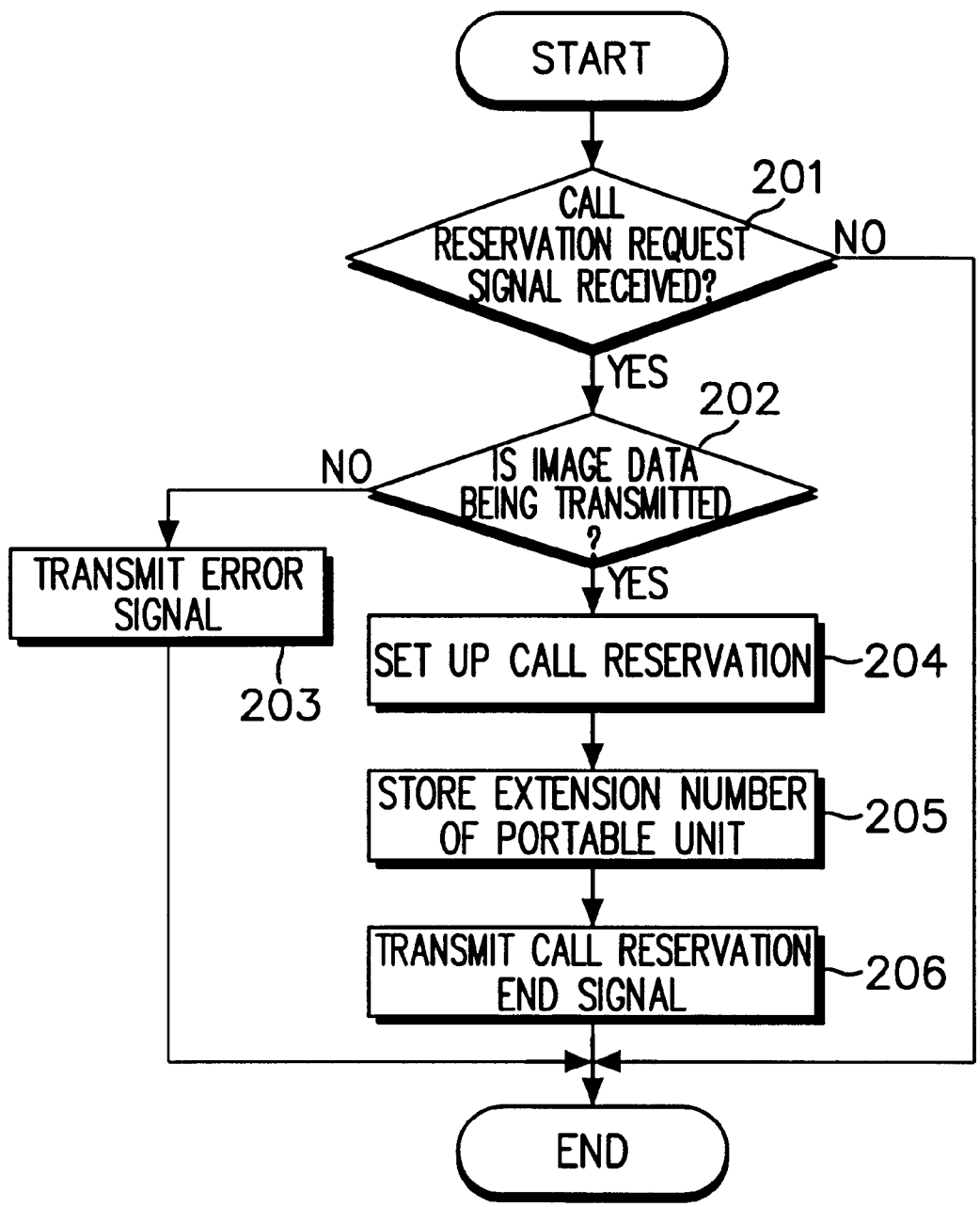

FIGS. 3A and 3B show flow charts for making a call reservation using the portable unit, in which steps 101–107 of FIG. 3A are controlled by the portable unit of FIG. 1 and steps 201–206 of FIG. 3B are controlled by the base unit of FIG. 2.

Figure 4A:
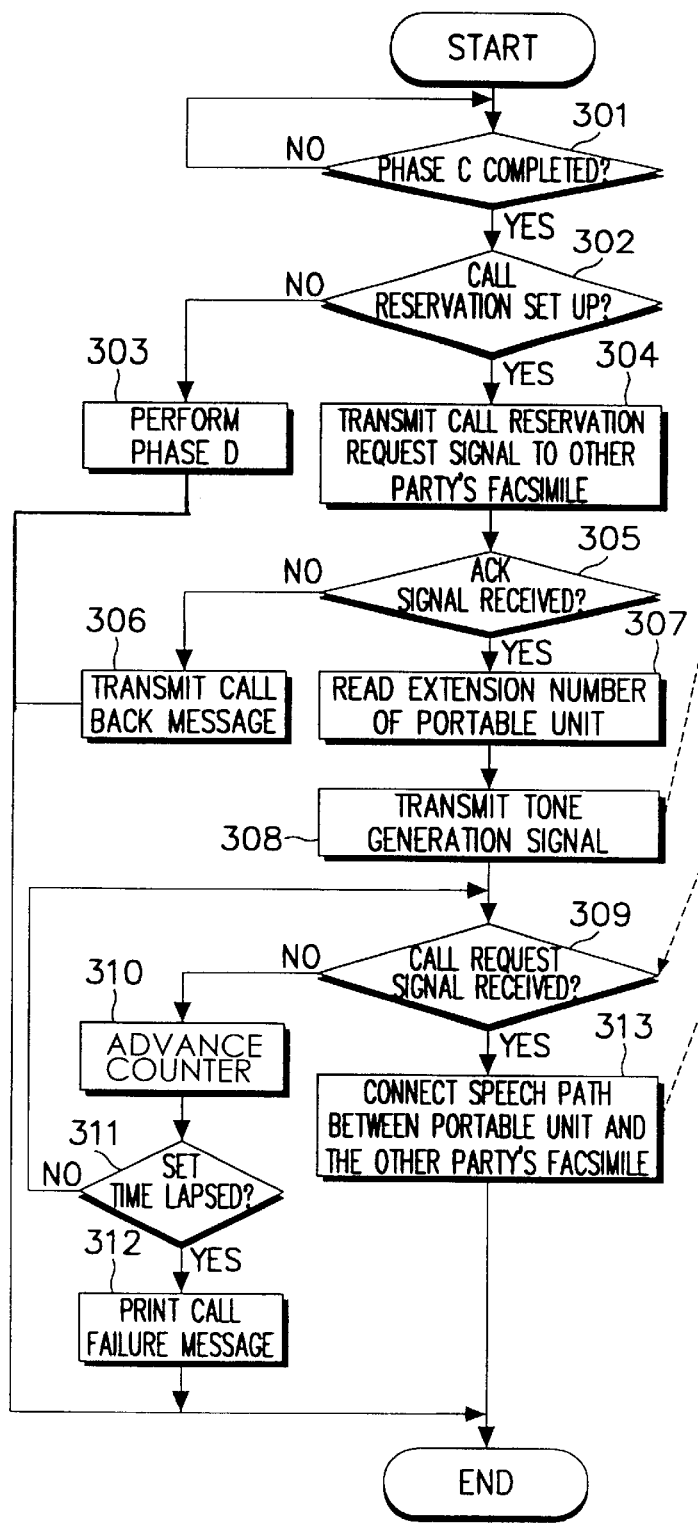
FIGS. 4A and 4B are flow charts for conducting a telephone conversation on the reserved call using the portable unit according to the principles of the present invention.
Figure 4B:
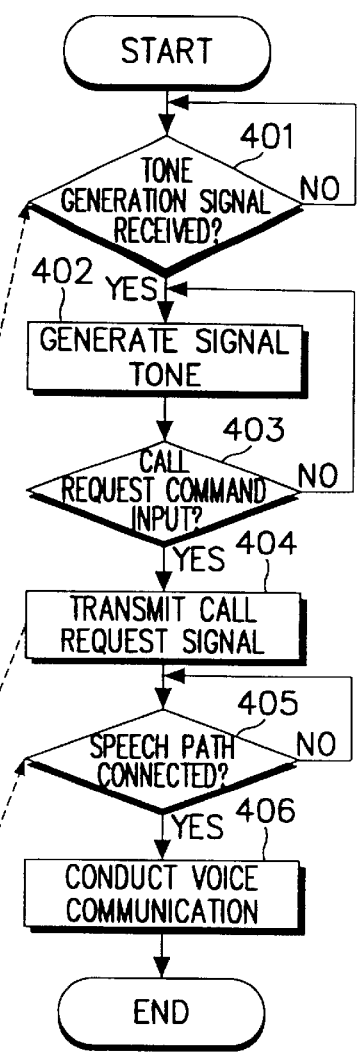

FIGS. 4A and 4B show flow charts for conducting a telephone conversation on the reserved call using the portable unit, upon completion of transmitting/receiving the image data, in which steps 301–313 of FIG. 4A are controlled by the base unit of FIG. 2 and steps 401–406 of FIG. 4B are controlled by the portable unit of FIG. 1.

A preferred embodiment of the present invention will be described in detail hereinbelow with reference to FIGS. 1 through 4B.

Referring to FIGS. 3A and 3B, to make a call reservation using the portable unit, the portable unit controller 12 checks at step 101 whether the user inputs a call reservation command by using the keypad 10. If the call reservation command is input, step 101 proceeds to step 103, and otherwise, to step 102 to perform a corresponding function (i.e., a function which was being executed previously). At step 103, the RF transmitter 18 transmits a call reservation request signal to the base unit of the facsimile apparatus, under the control of the portable unit controller 12. Then, at step 201, the CPU 50 checks whether the RF receiver 36 of the RF section 70 has received the call reservation request signal from the portable unit. If the call reservation request signal is received, step 201 proceeds to step 202, and otherwise, ends the program. At step 202, the CPU 50 checks whether the facsimile is currently transmitting/receiving the image data, i.e., operating in a facsimile mode. If the facsimile is currently operating in a facsimile mode, step 202 proceeds to 204, and otherwise, to step 203. At step 204, the CPU 50 sets up the call reservation and at step 205, stores in the memory 54 an extension number for the portable unit that has requested the call reservation. After storing the extension number, the signal controller 38 and the RF transmitter 34 transmit a call reservation end signal to the portable unit at step 206, under the control of the CPU 50. At step 203, the CPU 50 controls the signal controller 38 and the RF transmitter 34, to transmit a call reservation error signal to the portable unit. Here, it should be noted that the call reservation can be made only while the facsimile apparatus is transmitting or receiving the image data to or from a facsimile of the other party. Then, at step 104, the portable unit controller 12 checks whether the RF receiver 22 has received the call reservation error signal from the base unit. If the call reservation error signal is received, step 104 proceeds to step 105 to display an error message on a display unit such as a liquid crystal display (not shown) disposed in the keypad 10, and otherwise, to step 106 to check whether the RF receiver 22 has received the call reservation end signal from the base unit. If the call reservation end signal is received, step 106 proceeds to step 107, and otherwise, returns to step 104. At step 107, the portable unit controller 12 displays on the liquid crystal display a call reservation end message indicating that the call reservation has been successfully made, and thereafter, ends the program. Although the error message and the call reservation end message are displayed on the liquid crystal display, it can be understood that the messages can be indicated by generating a beep tone or by using LEDs (Light Emitting Diodes).

Referring to FIGS. 4A and 4B, there is shown a method for establishing a voice communication path between the portable unit and the facsimile of the other party, to enable the user to talk with the other party (subscriber) over the telephone using the portable unit. In general, the facsimile apparatus has five procedure known phases; Phase A to connect to the telephone line; Phase B to perform a pre-protocol; Phase C to process the image data; Phase D to perform a post-protocol; and Phase E to disconnect the telephone line. Turning to FIG. 4A, the CPU 50 checks at step 301 whether the Phase C is completed or not (i.e., whether the facsimile apparatus has completely transmitted and received the image data) by interchanging protocol signals with the facsimile of the other party. If the Phase C is completed, step 301 proceeds to step 302, and otherwise, waits for the Phase C to be completed. At step 302, the CPU 50 checks whether the call reservation has been set up or not. If the call reservation has been set up, step 302 goes to step 304, and otherwise, to step 303 to perform the Phase D (i.e., the post-protocol procedure). At step 304, the CPU 50 controls the RF transmitter 34 to transmit the call reservation request signal to the facsimile of the other party by interchanging protocol signals with the facsimile of the other party. After transmission of the call reservation request signal, the CPU 50 checks at step 305 whether the RF receiver 36 has received an acknowledge signal from the facsimile of the other party, indicating receipt of the call reservation request signal, by interchanging protocol signals with the facsimile of the other party. If the acknowledge signal has been received, step 305 proceeds to step 307, and otherwise, to step 306 to transmit a call back message to the facsimile of the other party after lapse of a predetermined time and then, end the program. At step 307, the CPU 50 reads the extension number of the portable unit from the memory 54 and then, proceeds to step 308. At step 308, the CPU 50 controls the signal controller 38 and the RF transmitter 34 to transmit a tone generation signal indicating initiation of the voice communication to the portable unit. Then, at step 401, the portable unit controller 12 checks whether the RF receiver 22 has received the tone generation signal from the base unit. If the tone generation signal has been received, step 401 proceeds to step 402, and otherwise, waits for the tone generation signal to be received. At step 402, the portable unit controller 12 generates a signal tone indicating the initiation of the voice communication, upon receiving the tone generation signal. After generation of the signal tone, the portable unit controller 12 checks at step 403 whether the user has requested to make the call (i.e., to conduct the reserved call) by off-hooking the portable unit upon hearing the signal tone. If the user has requested to make the call, step 403 proceeds to step 404, and otherwise, returns to step 402. At step 404, the portable unit controller 12 controls the RF transmitter 18 to transmit the call request signal to the base unit. Then, at step 309, the CPU 50 checks whether the RF receiver 36 has received the call request signal from the portable unit. If the call request signal has been received, step 309 goes to step 313, and otherwise, to step 310. At step 310, the CPU 50 advances an internal counter (not shown), and checks at step 311 whether a predetermined time has elapsed or not according to the count of the counter. If the predetermined time has elapsed, step 311 proceeds to step 312, and otherwise, returns to step 309. At step 312, the CPU 50 controls the printer 56 to print a call failure message on the recording paper, and then, ends the program. At step 313, upon receiving the call request signal from portable unit, the CPU 50 controls the line interface unit 60 to disconnect the data communication path between the modem 58 and the facsimile of the other party, and further controls the line interface unit 60 to connect the voice communication path between the portable unit and the facsimile of the other party. Then, at step 405, the portable unit controller 12 checks whether the voice communication path is connected or not. If it is connected, step 405 proceeds to step 406, and otherwise, waits for the voice communication path to be connected. At step 406, the user of the portable unit talks with the other party over the telephone and ends the program after completion of the telephone conversation.

In the foregoing description, although the base unit stores the extension number of the portable unit that has made the call reservation and reads the extension number stored upon receipt of the acknowledge signal to connect the voice communication path between the portable unit and the facsimile of the other party, it can be appreciated that the facsimile apparatus having a plurality of the portable units does not store the extension numbers of the portable units and enables the user to talk with the other party over the telephone using any of the portable units. In this case, upon receiving the acknowledge signal from the facsimile of the other party, the CPU 50 transmits the tone generation signal to all the portable units, and then, connects the voice communication path only to the portable unit that has requested to make the call.

As described above, the subscriber can make a call reservation and talk with the reserved party over the telephone, using the portable unit. Thus, even in case the user stays at a distance from the base unit, he or she can make the call reservation and talk with the reserved party, without moving to the place where the base unit of the facsimile apparatus is located.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for making a call reservation using a portable unit in a facsimile apparatus, comprising steps of:

setting up a call reservation using the portable unit, while the facsimile apparatus is operating in a facsimile mode with a facsimile apparatus of a subscriber;

displaying a call reservation error message on a display unit of said portable unit, when said step of setting up a call reservation is performed while the facsimile apparatus is not operating in said facsimile mode; and upon completion of said facsimile mode, automatically connecting a voice communication path between said portable unit and said facsimile apparatus of said subscriber for enabling said subscriber to talk with a user of said portable unit, when said call reservation has been set up.

2. A method for making a call reservation using a portable unit in a first facsimile apparatus, comprising steps of:

setting up a call reservation into a base unit of the first facsimile apparatus by using a keyboard of the portable unit, while the first facsimile apparatus is operating in a data communication mode with a second facsimile apparatus;

connecting a voice communication path between said portable unit and said second facsimile apparatus, when said call reservation has been set and upon receiving an acknowledge signal from said second facsimile apparatus, to enable a user of said portable unit to talk to a user of said second facsimile apparatus after completing operation in said data communication mode; and displaying a call reservation error message on a display unit of said portable unit, when said step of setting up a call reservation is performed while the first facsimile apparatus is not operating in said data communication mode.

3. The method as set forth in claim 2, further comprising a step of storing, in a memory of said first facsimile apparatus, an extension number of the portable unit performing said step of setting up a call reservation.

4. The method as set forth in claim 2, further comprising a step of displaying a call reservation end message on a display unit of said portable unit, upon completion of the step of setting up a call reservation.

5. A method for making a call reservation using a portable unit in a facsimile apparatus, comprising steps of:

setting up a call reservation in a base unit of said facsimile apparatus in response to a call reservation request signal from the portable unit, while said facsimile apparatus is in a facsimile mode of operation;

transmitting protocol signals including a call reservation request signal to a facsimile apparatus of a second party, upon completion of said facsimile mode of operation;

transmitting a tone generation signal indicating initiation of a voice communication mode of operation to said portable unit, upon receiving an acknowledge signal, in response to the call reservation request signal, from the facsimile of the second party;

causing the portable unit to transmit a call request signal to said base unit, if a user of said portable unit requests to make a call upon hearing a signal tone generated in response to the tone generation signal;

printing a call failure message, if the call request signal is not received from the portable unit during a predetermined time period;

connecting a voice communication path between said portable unit and the facsimile apparatus of said second party, upon receiving said call request signal; and conducting a voice communication between the user of portable unit and the second party over said voice communication path.

6. The method for making a call reservation using a portable unit as claimed in claim 5, wherein said step for setting up the call reservation comprises steps of:

checking whether the facsimile apparatus is in said facsimile mode of operation upon receiving the call reservation request signal from said portable unit;

causing the base unit to setup the call reservation, if the facsimile apparatus is currently in said facsimile mode of operation;

storing in a memory an extension number of the portable unit which has generated said call reservation request signal;

transmitting a call reservation end signal to the portable unit, upon completion of the storing step; and causing the portable unit to display a call reservation end message on a display unit thereof, upon receiving the call reservation end signal from the base unit.

7. A method for making a call reservation using a portable unit in a facsimile apparatus, comprising steps of:

setting up a call reservation in a base unit of said facsimile apparatus in response to a call reservation request signal from the portable unit, while said facsimile apparatus is in a facsimile mode of operation;

displaying a call reservation error message on the display unit of said portable unit, if the call reservation request signal is received by said base unit while said facsimile apparatus is not in said facsimile mode of operation;

transmitting protocol signals including a call reservation request signal to a facsimile apparatus of a second party, upon completion of said facsimile mode of operation;

transmitting a tone generation signal indicating initiation of a voice communication mode of operation to said portable unit, upon receiving an acknowledge signal, in response to the call reservation request signal, from the facsimile of the second party;

causing the portable unit to transmit a call request signal to said base unit, if a user of said portable unit requests to make a call upon hearing a signal tone generated in response to the tone generation signal;

connecting a voice communication path between said portable unit and the facsimile apparatus of said second party, upon receiving said call request signal; and conducting a voice communication between the user of portable unit and the second party over said voice communication path.

8. The method for making a call reservation using a portable unit as claimed in claim 7, further comprising a step of reading from memory an extension number of the portable unit that has generated the call reservation request signal, upon receiving the acknowledge signal from the facsimile apparatus of said second party.

9. The method for making a call reservation using a portable unit as claimed in claim 7, wherein only the user of said portable unit that has generated the call reservation request signal can communicate with said second party.

10. The method for making a call reservation using a portable unit as claimed in claim 7, further comprising a step of transmitting a call back message to the facsimile apparatus of the second party, if the acknowledge signal for the call reservation request signal is not received from the facsimile apparatus of the second party.

11. The method for making a call reservation using a portable unit as claimed in claim 7, further comprising a step of printing a call failure message, if the call request signal is not received from the portable unit during a predetermined time period.

12. The method for making a call reservation using a portable unit as claimed in claim 7, wherein said portable unit transmits the call request signal to the base unit by off-hooking the portable unit.

13. A method for making a call reservation using a portable unit in a facsimile apparatus, comprising steps of:

causing the portable unit to transmit a call reservation request signal to a base unit of the facsimile apparatus;

checking whether the base unit is in a data communication mode with a second facsimile apparatus, upon receipt of said call reservation request signal by said base unit;

setting up a call reservation, upon receiving the call reservation request signal from the portable unit, when it is determined that said facsimile apparatus is in said data communication mode;

displaying a call reservation end message on a display unit of said portable unit, after setting up the call reservation;

determining whether said data communication mode has ended;

transmitting protocol signals including said call reservation request signal to said second facsimile apparatus when it is determined that said data communication mode has ended;

checking for an acknowledge signal in protocol signals, in response to said call reservation request signal, received from said second facsimile apparatus;

transmitting a tone generation signal to said portable unit upon receipt of said acknowledge signal;

transmitting a call request signal from said portable unit to said base unit in response to receipt of said tone generation signal; and connecting a voice communication path between said portable unit and second facsimile apparatus upon receipt of said call request signal by the base unit.

14. A method for making a call reservation using a portable unit as claimed in claim 13, further comprising a step of displaying a call reservation error message on a display unit of said portable unit, when said step of checking whether the base unit is in a data communication mode with a second facsimile apparatus determines that said facsimile apparatus is not in said data communication mode.

15. A method for making a call reservation using a portable unit as claimed in claim 13, further comprising a step of storing in a memory an extension number of the portable unit that has made the call reservation upon completion of said step of setting up said call reservation.

16. A method for making a call reservation using a portable unit as claimed in claim 13, further comprising a step of reading an extension number from a memory of the portable unit, upon receiving the acknowledge signal.

* * * * *